US012701207B2

(12) United States Patent (10) Patent No.: US 12,701,207 B2
Li et al. (45) Date of Patent: Aug. 4, 2026

(54) DATA PROCESSING METHOD, APPARATUS AND ELECTRONIC DEVICE

(71) Applicant: Beijing Zitiao Network Technology Co., Ltd., Beijing (CN)

(72) Inventors: Lei Li, Beijing (CN); Xinyu Cui, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 334 days.

(21) Appl. No.: 18/320,801

(22) Filed: May 19, 2023

(65) Prior Publication Data

US 2023/0362342 A1 Nov. 9, 2023

(30) Foreign Application Priority Data

May 20, 2022 (CN) .......................... 202210556100.7

(51) Int. Cl.
*H04N 13/161* (2018.01)
*H04N 13/194* (2018.01)
(Continued)

(52) U.S. Cl.
CPC ......... *H04N 13/161* (2018.05); *H04N 13/194* (2018.05); *H04N 13/366* (2018.05); *H04N 13/344* (2018.05)

(58) Field of Classification Search
CPC .. H04N 13/261; H04N 13/344; H04N 13/366; H04N 13/194; H04N 13/161
See application file for complete search history.

(56) References Cited

U.S. PATENT DOCUMENTS

2013/0128012 A1* 5/2013 Turner ................. H04N 13/383
348/E13.041
2017/0078651 A1* 3/2017 Russell ................ H04N 13/133
(Continued)

FOREIGN PATENT DOCUMENTS

CN 106095113 A 11/2016
CN 107659772 A 2/2018
(Continued)

OTHER PUBLICATIONS

Office Action for Chinese Patent Application No. 202210556100.7, mailed on Mar. 24, 2026, 13 pages.

*Primary Examiner* — Kathleen V Nguyen
(74) *Attorney, Agent, or Firm* — Astute IP Law Group

(57) ABSTRACT

The present disclosure relates to a data processing method, an apparatus, and an electronic device, which relates to the technical field of data processing. The method comprises: a VR device decodes received image data to obtain a planar image to be processed; first acquiring field of view information of a user; then generating, according to the field of view information and the planar image, a left eye image and a right eye image at a same timestamp; and displaying a virtual reality image according to the left eye image and the right eye image at the same timestamp. The present disclosure can reduce the amount of transmitted data by half, reduce the pressure on network bandwidth by half, reduce the situation of network congestion, and correspondingly reduce the transmission delay. The simplified processing procedures result in no problem of asynchronous transmission between the left eye and the right eye.

20 Claims, 6 Drawing Sheets

(51) Int. Cl.
    *H04N 13/366*     (2018.01)
    *H04N 13/344*     (2018.01)

(56)         References Cited

U.S. PATENT DOCUMENTS

2019/0215505 A1    7/2019  Ishii et al.
2023/0419629 A1*  12/2023  Huang ................... G06T 7/596

FOREIGN PATENT DOCUMENTS

| CN | 107810633 A | 3/2018 | |
| CN | 108921050 A | 11/2018 | |
| CN | 112975972 A | 6/2021 | |
| KR | 10-2012-0140426 A | 12/2012 | |
| WO | WO-2013022311 A2 * | 2/2013 | ........... H04N 13/178 |

* cited by examiner

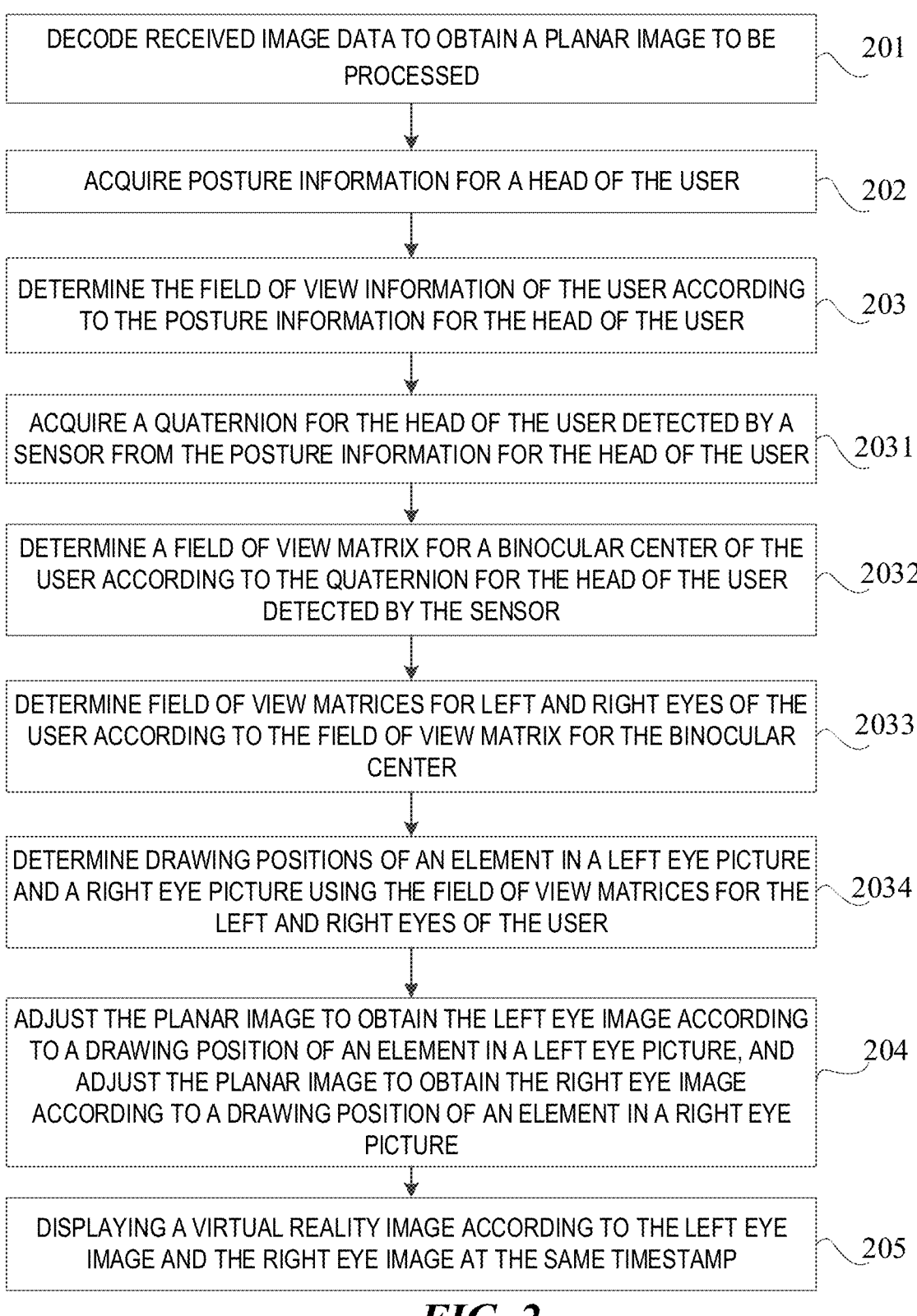

DECODE RECEIVED IMAGE DATA TO OBTAIN A PLANAR IMAGE TO BE PROCESSED — 201

ACQUIRE POSTURE INFORMATION FOR A HEAD OF THE USER — 202

DETERMINE THE FIELD OF VIEW INFORMATION OF THE USER ACCORDING TO THE POSTURE INFORMATION FOR THE HEAD OF THE USER — 203

ACQUIRE A QUATERNION FOR THE HEAD OF THE USER DETECTED BY A SENSOR FROM THE POSTURE INFORMATION FOR THE HEAD OF THE USER — 2031

DETERMINE A FIELD OF VIEW MATRIX FOR A BINOCULAR CENTER OF THE USER ACCORDING TO THE QUATERNION FOR THE HEAD OF THE USER DETECTED BY THE SENSOR — 2032

DETERMINE FIELD OF VIEW MATRICES FOR LEFT AND RIGHT EYES OF THE USER ACCORDING TO THE FIELD OF VIEW MATRIX FOR THE BINOCULAR CENTER — 2033

DETERMINE DRAWING POSITIONS OF AN ELEMENT IN A LEFT EYE PICTURE AND A RIGHT EYE PICTURE USING THE FIELD OF VIEW MATRICES FOR THE LEFT AND RIGHT EYES OF THE USER — 2034

ADJUST THE PLANAR IMAGE TO OBTAIN THE LEFT EYE IMAGE ACCORDING TO A DRAWING POSITION OF AN ELEMENT IN A LEFT EYE PICTURE, AND ADJUST THE PLANAR IMAGE TO OBTAIN THE RIGHT EYE IMAGE ACCORDING TO A DRAWING POSITION OF AN ELEMENT IN A RIGHT EYE PICTURE — 204

DISPLAYING A VIRTUAL REALITY IMAGE ACCORDING TO THE LEFT EYE IMAGE AND THE RIGHT EYE IMAGE AT THE SAME TIMESTAMP — 205

*FIG. 2*

DATA PROCESSING METHOD, APPARATUS AND ELECTRONIC DEVICE

CROSS REFERENCE TO RELATED APPLICATIONS

The present application claims priority to Chinese Patent Application No. 202210556100.7, entitled "DATA PROCESSING METHOD, APPARATUS AND ELECTRONIC DEVICE," filed on May 20, 2022, the contents of which are hereby incorporated by reference in its entirety.

TECHNICAL FIELD

The present disclosure relates to the field of data processing technology, and in particular to a virtual reality image processing method, a virtual reality image processing apparatus, and an electronic device.

BACKGROUND

With the continuous development of virtual reality (VR) technology, the use of VR devices is becoming increasingly popular. The use of people's binocular stereo vision may provide viewing experience of a stereoscopic panoramic image.

At present, the existing solution is to first copy a single planar image into two identical left eye image data and right eye image data at a computer end, a television end, or a mobile phone end, etc. Then, left eye and right eye images may be transmitted through a concatenation or a dual channel transmission to a VR device for analyzing, decoding, and pushing to a screen for displaying.

However, this method increases data transmission amount of virtual reality image data, which is easy to cause technical problems such as network congestion and transmission delay.

SUMMARY

The present disclosure provides a data processing method, a data processing apparatus and an electronic device, which mainly aims at addressing the technical problems of the increase of the data transmission amount of the virtual reality image data at present, which is easy to cause network congestion and transmission delay.

In a first aspect of the present disclosure, a data processing method is provided. The method comprises decoding received image data to obtain a planar image to be processed; acquiring field of view information of a user; generating, according to the field of view information and the planar image, a left eye image and a right eye image at a same timestamp; displaying a virtual reality image according to the left eye image and the right eye image at the same timestamp.

In a second aspect of the present disclosure, a data processing apparatus is provided. The apparatus comprises a decoding module, configured to decode received image data to obtain a planar image to be processed; an acquiring module, configured to acquire field of view information of a user; a generating module, configured to generate, according to the field of view information and the planar image, a left eye image and a right eye image at a same timestamp; a displaying module, configured to display a virtual reality image according to the left eye image and the right eye image at the same timestamp.

In a third aspect of the present disclosure, a computer-readable storage medium is provided. The medium stores a computer program thereon that, when executed by a processor to implement the data processing method of the first aspect.

In a fourth aspect of the present disclosure, an electronic device is provided. The electronic device comprises a storage medium, a processor, and a computer program stored in the storage medium and executable on the processor, and the processor implements the data processing method of the first aspect when executing the computer program.

By utilizing the above-mentioned technical solutions, the present disclosure provides a data processing method, a data processing apparatus, and an electronic device that may obtain the left eye image and the right eye image for panoramic stereoscopic display through the field of view information of the user at a VR device end, thereby implementing the technical solution of transmitting the planar image while presenting a stereoscopic display effect at the VR device end. Specifically, decoding the received image data at the VR device end to obtain the planar image to be processed. Firstly, the field of view information of the user is acquired. Then, the left eye image and the right eye image at the same timestamp are generated according to the field of view information and the planar image. After that, the virtual reality image is displayed according to the left eye image and the right eye image at the same timestamp. By applying the technical solution of the present disclosure, it is not necessary to first copy a planar image into two identical left eye image data and right eye image data for transmission, instead single original planar image data is transmitted. After receiving a single planar image at the VR device end, a computation is performed according to the field of view information of a current user to obtain images suitable for the field of view of the left eye and the field of view of the right eye respectively, which are finally displayed at the VR device end. An actual effect experienced by the user is a processed stereoscopic visual effect. Compared with the prior art, on the premise of ensuring the display effect, the present disclosure can reduce the amount of transmitted data by half, reduce the pressure on network bandwidth by half, reduce the situation of network congestion, and correspondingly reduce the transmission delay. There will be no problem of asynchronous transmission between the left eye and the right eye, and entire processing procedures can be simplified to be more concise and reasonable.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

BRIEF DESCRIPTION OF DRAWINGS

The accompanying drawings, which are incorporated herein into and form a part of the specification, illustrate embodiments consistent with the present disclosure and are used in conjunction with the specification to explain the principles of the present disclosure.

To illustrate technical solutions in embodiments of the present disclosure or in the prior art more clearly, a brief introduction will be given to the accompanying drawings required in the description of the embodiments or the prior art. It is evident that for an ordinary person skilled in the art, other accompanying drawings can also be obtained according to these drawings without any creative effort.

FIG. 2 shows a schematic flowchart of another data processing method provided by some embodiments of the present disclosure;

DETAILED DESCRIPTION

The embodiments of the present disclosure will be described in more detail below with reference to the accompanying drawings. It should be noted that the embodiments and features in the embodiments in the present disclosure may be combined with each other without conflict.

Figure 1:
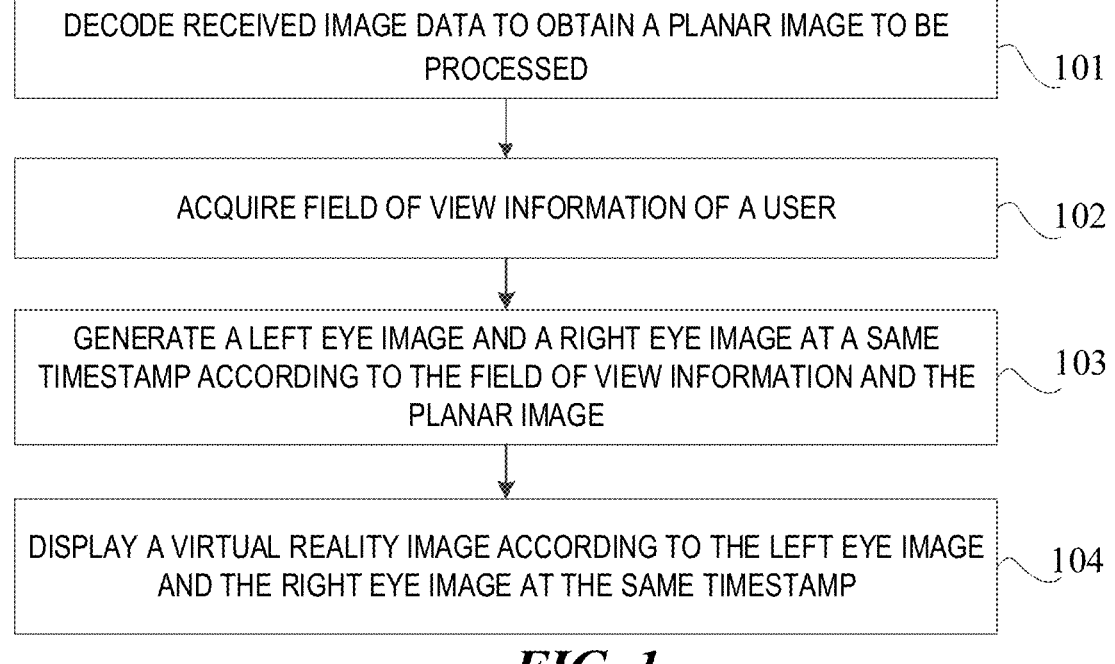
FIG. 1 shows a schematic flowchart of a data processing method provided by some embodiments of the present disclosure.

In order to addressing the technical problems of the increase of the data transmission amount of the virtual reality image data at present, which is easy to cause network congestion and transmission delay, this embodiment provides a data processing method, as shown in FIG. 1, which may be applied to a side of a VR device end. The method comprises the following steps.

Step 101: received image data is decoded to obtain a planar image to be processed.

In this embodiment, the image data received by the VR device may be video data or image data, etc. For example, taking a transmission process of a single planar image as an example, the single planar image may be obtained from a computer end, a television end, or a mobile phone end, etc. Then, the single planar image may be encoded, and an encoded image data is sent to the VR device end. Specifically, data packages may be sent to the VR device end through wired or wireless means. The VR device end parses the received data package, decodes the received image data, and obtains the single planar image. Then, the single planar image is processed to obtain images suitable for a field of view of a left eye and a right eye, which are displayed at the VR device end. Specific processes may be executed as shown in steps 102 to 104.

Compared with the prior art, this embodiment does not need to copy a plane image into two identical left eye image data and right eye image data at the computer end, the television end, or the mobile phone end for transmission. Instead, single original plane image data is transmitted, which reduces the amount of transmitted data by half, reduces the pressure on network bandwidth by half, reduces the situation of network congestion, and correspondingly reduce the transmission delay.

Step 102: field of view information of a user is acquired.

In this embodiment, a deflection of the field of view may be determined based on the field of view information of the user to acquire a left eye image and a right eye image for panoramic stereoscopic display. For example, for a head-mounted VR device, the field of view information of the user may be acquired through head parameters (which may vary for each user and may be detected through a sensor of the VR device) of the user.

Step 103: a left eye image and a right eye image at a same timestamp are generated according to the field of view information and the planar image.

Stereo vision is commonly referred to as 3D, which comes from the abbreviation of three-dimensional in English. The core of 3D imaging technology is the principle that human eyes observe objects at slightly different angles and thus can distinguish the distance of objects and generate stereoscopic vision. The images seen by the left eye and the right eye are separated, so that a viewer may see a stereo image or watch a video with a sense of space on a 2D display plane, greatly enhancing a sense of presence and experience of an audience.

Regarding binocular stereo vision, the first aspect is a convergence angle. When viewing a close object, lines of sight of both eyes converges inward. A brain acquires spatial depth information through the convergence angle of the lines of sight of the left eye and the right eye, with an effective range within 20 meters. The second aspect is parallax. Because images viewed by the left eye and the right eye have a difference, a human brain may perceive the spatial depth information, also known as a stereoscopic effect, through the difference between image positions of the left eye and the right eye. The brain is very sensitive to the parallax, and may feel binocular parallax of $\frac{1}{60}$ degree, which is 1 minute of arc.

The VR device in this embodiment utilizes the binocular stereo vision of the user. Two images which are the left eye image and the right eye image are usually generated by a video, then merged into one image, and finally a binocular stereoscopic effect is presented using the VR device. An aspect ratio of the video is usually 1:1 (such as 4096*4096) which may be composed of a left eye panoramic image and a right eye panoramic image each with an aspect ratio of 2:1. For a binocular stereoscopic panoramic video, after the video is generated, the left eye panoramic image is placed on the top half and the right eye panoramic image is placed on the bottom half to form an image. Then, a video sequence is generated based on the image, and finally, the video sequence is encoded into an MP4 file using H264 for the VR device to use.

For this embodiment, in order to achieve the above purposes, image processing may be performed according to the field of view information (the deflection of the field of view) of the user to generate the left eye image and the right eye image at the same timestamp. Then the left eye image and the right eye image may be merged into one image, and finally the one image may be presented with the binocular stereoscopic effect using the VR device. The processes are shown in step 104.

Step 104: a virtual reality image is displayed according to the left eye image and the right eye image at the same timestamp.

In this embodiment, the left eye image and the right eye image for panoramic stereoscopic display may be acquired through the field of view information of the user at the VR device end. Thereby, the technical solutions of transmitting the planar image while presenting the stereoscopic display effect at the VR device end can be achieved.

By applying the technical solutions of this embodiment, it is not necessary to first copy the planar image into two identical left eye image data and right eye image data for transmission. Instead, single original planar image data is transmitted. After the VR device end receives the single planar image, a computation is performed according to the field of view information of a current user to obtain images suitable for the field of view of the left eye and the field of view of the right eye respectively which are finally displayed at the VR device end. An actual effect experienced by the user is a processed stereoscopic visual effect. Compared with the prior art, on the premise of ensuring the display effect, the present disclosure can reduce the amount of transmitted data by half, reduce the pressure on network bandwidth by half, reduce the situation of network congestion, and correspondingly reduce the transmission delay. There will be no problem of asynchronous transmission between the left eye and the right eye, and the entire processing procedure can be simplified to be more concise and reasonable.

Furthermore, as a refinement and an extension of the above embodiments, this embodiment provides a specific method as shown in FIG. 2, in order to fully illustrate specific implementation processes of the method in this embodiment. The method comprises the following steps.

Step 201: the received image data is decoded to obtain the planar image to be processed.

Step 202: posture information is acquired for a head of the user.

The posture information for the head of the user may include information related to a posture for the head of the user.

Step 203: the field of view information of the user is determined according to the posture information for the head of the user.

For this embodiment, the field of view information of the user can be accurately determined by using the posture information for the head of the user. Therefore, the deflection of the field of view of the user can be accurately determined, in order to accurately generate the left eye image and the right eye image that meet requirements through the planar image subsequently.

Optionally, the field of view information may comprise field of view matrix information of the user. To illustrate a field of view matrix (Lookat Matrix), it is supposed that there is an observer (camera) in a 3D space, and the observer has three parameters including a coordinate position, the field of view, and a focus. According to these three parameters, an orthogonalized and normalized coordinate system (an orthogonalized and unitized 3×3 matrix) may be established, and a matrix corresponding to this coordinate system is the field of view matrix.

In an option, step 203 may specifically perform the processes shown from step 2031 to step 2034.

Step 2031: a quaternion for the head of the user detected by a sensor is acquired from the posture information for the head of the user.

Step 2032: according to the quaternion for the head of the user detected by the sensor, a field of view matrix for a binocular center of the user is determined.

The sensor may be connected to or on the VR device, and may be used to detect the quaternion for the head of the user. The quaternion for the head of the user may in turn serve as a reference to determine the field of view matrix for the binocular center of the user. As the head rotates, the quaternion may be generated, which is detectable by the sensor. For example, the quaternion for a human head detected by the sensor is ovrQuatf (w, x, y, z). In order to easily apply this quaternion in a program, it needs to be converted into a matrix form, so that it can be computed based on matrix knowledge of linear algebra.

Optionally, step 2032 may specifically comprise firstly converting the quaternion for the head of the user into the matrix form, to obtain a rotation matrix for the binocular center of the user, and according to a position of the binocular center in a world coordinate system, determining an offset matrix for the binocular center of the user; and then determining the field of view matrix for the binocular center according to the rotation matrix for the binocular center and the offset matrix for the binocular center.

In an option, the rotation of an eye posture and the rotation of a head posture use a same quaternion. Therefore, the quaternion for the head posture may be subjected to the above transformation to obtain the rotation matrix for the binocular center. At this point, according to the position of the binocular center in the world coordinate system, the offset matrix for the binocular center may be obtained.

In an example, the above-mentioned determining the field of view matrix for the binocular center according to the rotation matrix for the binocular center and the offset matrix for the binocular center specifically comprises: firstly multiplying the rotation matrix for the binocular center and the offset matrix for the binocular center to obtain a conversion matrix for the binocular center of the user; and then computing an inverse matrix of the conversion matrix for the binocular center to obtain the field of view matrix for the binocular center.

Through this option, the field of view matrix for binocular center of the user can be accurately obtained, facilitating the subsequent accurate generation of the left eye image and the right eye image, and ensuring the display effect of the virtual reality image.

Step 2033: according to the field of view matrix for the binocular center of the user, field of view matrices for left and right eyes of the user are determined.

In a VR device (such as VR glasses), there are two sets of lens components corresponding to the left eye and the right eye of the user. Because interpupillary distances of different users are different, if the distance between the lens components keeps constant, it will inevitably make it difficult for some users to achieve a good experience when using the VR device. A high-quality VR device also needs to have a function to adjust its focal length. Adjusting the interpupillary distance and the focal length to a reasonable position is necessary to accurately place the image on the retina (especially the focal length) to obtain a clear view and avoid ghosting.

The interpupillary distance is a prerequisite for generating different field of view. The larger the interpupillary distance, the larger the field of view generated when the lines of sight of both eyes converge, the richer the obtained information of both sides of the object, and the stronger the sense of space. When adjusting the interpupillary distance, the VR device combined with the sensor generally obtains a length of trajectory and a direction of eyeball movement as parameters for a synchronized adjustment of displayed binocular pictures, and thereby the synchronized adjustment of the binocular pictures can be implemented. In a practical application, the information of the focal length manually adjusted by the user may be stored in the VR device so that the system can obtain the information of parameters.

For a same VR scene, there is actually a difference in the images seen by the left eye and the right eye. This difference needs to be reflected by changing the position of the camera during drawing. Therefore, it is necessary to compute the field of view matrices for the cameras corresponding to the left eye and the right eye based on the previous steps. At this point, the first thing to understand is the concept of the interpupillary distance, for example, if the interpupillary distance is 0.0640f (meters), then the camera is needed to be offset by half the interpupillary distance to the left to form the camera position of the left eye, and the camera is needed to be offset by half the interpupillary distance to the right to form the camera position of the right eye. The computed offset (eyeOffset) of the left eye=–0.0320f (meters), and the computed offset (eyeOffset) of the right eye=0.0320f (meters).

In order to make the matrix perform the aforementioned offset, step 2033 may optionally include: firstly creating a homogeneous offset matrix based on the interpupillary distance of the user; then, according to the homogeneous offset matrix and the field of view matrix for the binocular center of the user, determining the field of view matrices for the left and right eyes of the user.

In an example, the aforementioned creating the homogeneous offset matrix based on the interpupillary distance of the user may specifically comprise: determining displacements required to be offset for the left and right eyes based on the interpupillary distance of the user; creating the homogeneous offset matrix using the displacements required to be offset for the left and right eyes.

The homogeneous offset matrix (Translation) is created to cause an object to undergo a displacement (x, y, z), a following homogeneous transformation matrix may be multiplied.

$$\begin{pmatrix} 1.0f & 0.0f & 0.0f & x \\ 0.0f & 1.0f & 0.0f & y \\ 0.0f & 0.0f & 1.0f & z \\ 0.0f & 0.0f & 0.0f & 1.0f \end{pmatrix}$$

Therefore, if the current camera is to be offset, the matrix corresponding to the camera may be multiplied by an offset matrix for the left and right eyes. Optionally, the aforementioned according to the homogeneous offset matrix and the field of view matrix for the binocular center, determining the fired of view matrices for the left and right eyes of the user may specifically comprise multiplying the field of view matrix for the binocular center of the user and the homogeneous offset matrix, to obtain the field of view matrices for the left and right eyes of the user.

For example, the camera matrix (i.e., the field of view matrix for the binocular center obtained in step 2032) is multiplied with this homogeneous offset matrix to obtain the field of view matrices for the left and right eyes of the user.

Step 2034: the field of view matrices for the left and right eyes of the user is used to determine drawing positions of an element in the left and right eye pictures.

Step 204: according to a drawing position of an element in a left eye picture, the planar image is adjusted to obtain the left eye image, and according to a drawing position of the element in a right eye picture, the planar image is adjusted to acquire the right eye image.

In this embodiment, the left eye image and the right eye image are computed respectively according to the field of view matrices and an original image. After acquiring the field of view matrices for the left and right eyes, a specific drawing position of the element (such as an object, a character, a background, etc.) in the left and right eye pictures may be determined by the field of view matrices.

Step 205: according to the left eye image and the right eye image at the same timestamp, a virtual reality image is displayed.

Optionally, step 205 may specifically include displaying the left eye image in a left eye displaying area, while displaying the right eye image in a right eye displaying area. For example, after processing at the above step 204, the acquired left and right eye images correspond one to one, and then the left and right eye images corresponding to the same timestamp are pushed to a screen (a screen of a VR device) for display.

To illustrate the specific implementation process of the above embodiments, the following application scenarios are provided, but not limited to the following scenarios.

A head-mounted VR device is a display device that utilizes VR technology, and a complete VR device includes a VR headset and a handle. A virtual user interface (UI) of the handle and the VR headset are usually used for operation to address interaction needs.

At present, one scenario of the existing VR panoramic experience is that left and right eyes data is acquired from a professional gaming platform and then pushed to a VR headset end for display; the other scenario is to push two panoramic images of the left and right eyes taken with different cameras to the VR headset for display. Regardless of the scenarios, images used for display that are either synthesized by a platform or captured by a camera are ready. If there are no ready left eye image and right eye image, for example, users may project the single planar image (such as a computer screen or a television screen) onto the VR headset for panoramic display, the current traditional processing procedures may be shown in FIG. 3. After processing on the computer end, the television end, or the mobile phone end, etc. to acquire the left eye image and the right eye image, the left eye image and the right eye image can be transmitted to the VR headset end through dual channels. Alternatively, the left eye image and the right eye image may be concatenated on the computer end, the television end, or the mobile phone end, and then transmitted.

Figure 4:
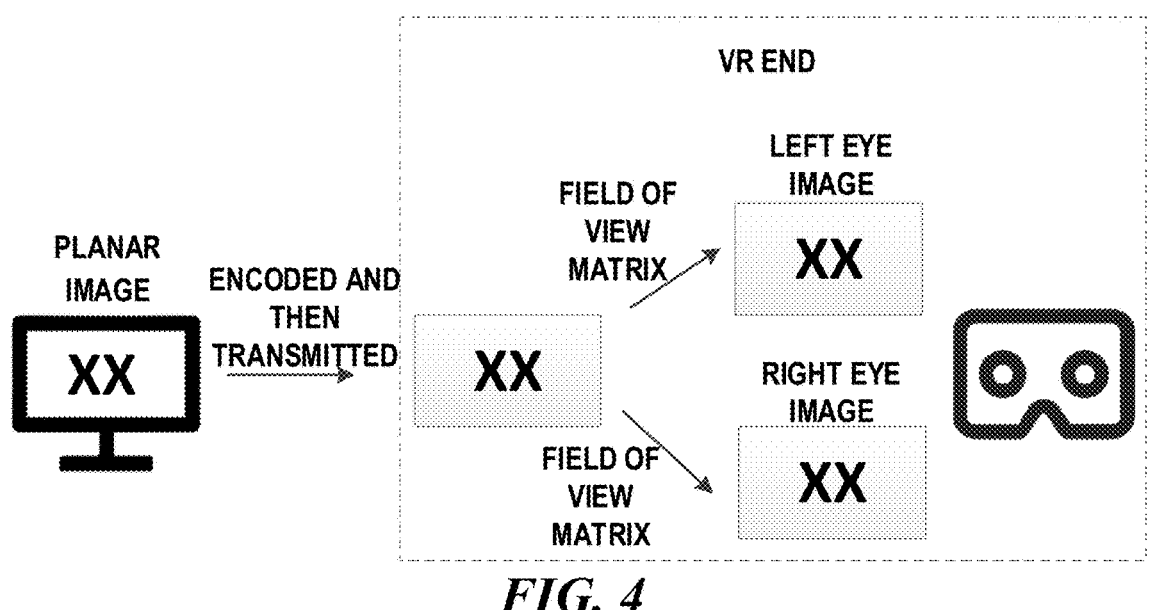
FIG. 4 shows a schematic diagram of processing procedures in some embodiments of the present disclosure.

As shown in FIG. 4, this embodiment is a single channel transmission, where the deflection of the field of view is computed based on the planar image (the original image) through the interpupillary distance of the user and focal length of the VR device at the side of the VR device end. A left eye stereoscopic panoramic image and a right eye stereoscopic panoramic image that belong to both eyes are acquired through the deflection of the field of view and processing an original planar image, and then displayed on the screen of the VR headset end.

Figure 3:
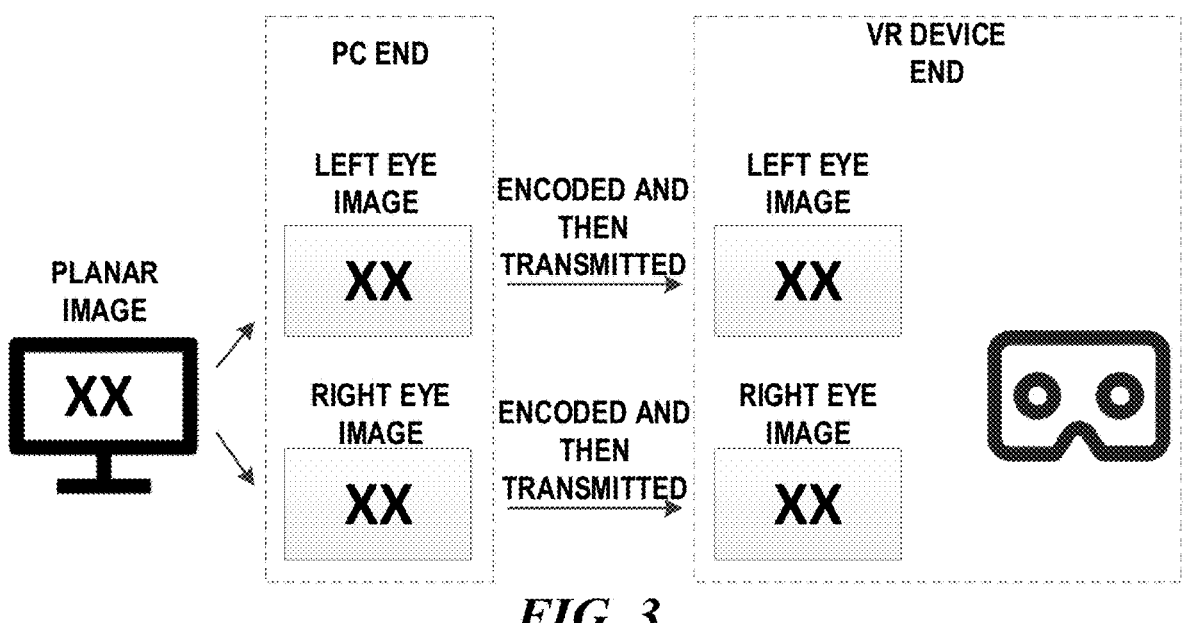
FIG. 3 shows a schematic diagram of processing procedures in the prior art.

As shown in FIG. 3, a planar image is first copied into two identical left eye image data and right eye image data in the prior art. Then, the left eye image and the right eye image are transmitted through a concatenation or a dual channel transmission to the headset end for parsing, decoding, and pushing to the screen for display. The improved scheme of the present disclosure (as shown in FIG. 4) only transmits the single original planar image data. After receiving the single planar image, the VR headset end may perform operations according to the field of view matrix of the current user to acquire images suitable for the field of view of the left eye and the right eye respectively, and finally display the images on the VR headset end. The actual effect experienced by the user is the processed stereoscopic visual effect.

Compared with the prior art, the present disclosure reduces the amount of transmitted data by half, thus reduces the pressure on network bandwidth by half, reduces the situation of network congestion and correspondingly reduces the transmission delay. In terms of the transmission delay, since the amount of transmitted data is only half of that in the prior art, time consumption of the transmission is only half of that in the existing solution. In the existing solution, the dual channel transmission of left eye data and right eye data may cause certain asynchronous phenomenon, while the present disclosure will not introduce a problem of asynchronous transmission of the left eye and the right eye. In addition, in the existing solution (the concatenation), the left data and the right eye data are needed to be copied together for transmission, and then the copied data is needed to be split at the receiving end. These operations consume part of the system resources and time delay. However, the present disclosure only performs the operation of the field of view matrix at the headset end, and only performs a sending operation at the computer end, the television end, or the mobile phone end, and the entire processing procedures can be simplified to be more concise and reasonable.

Figure 5:
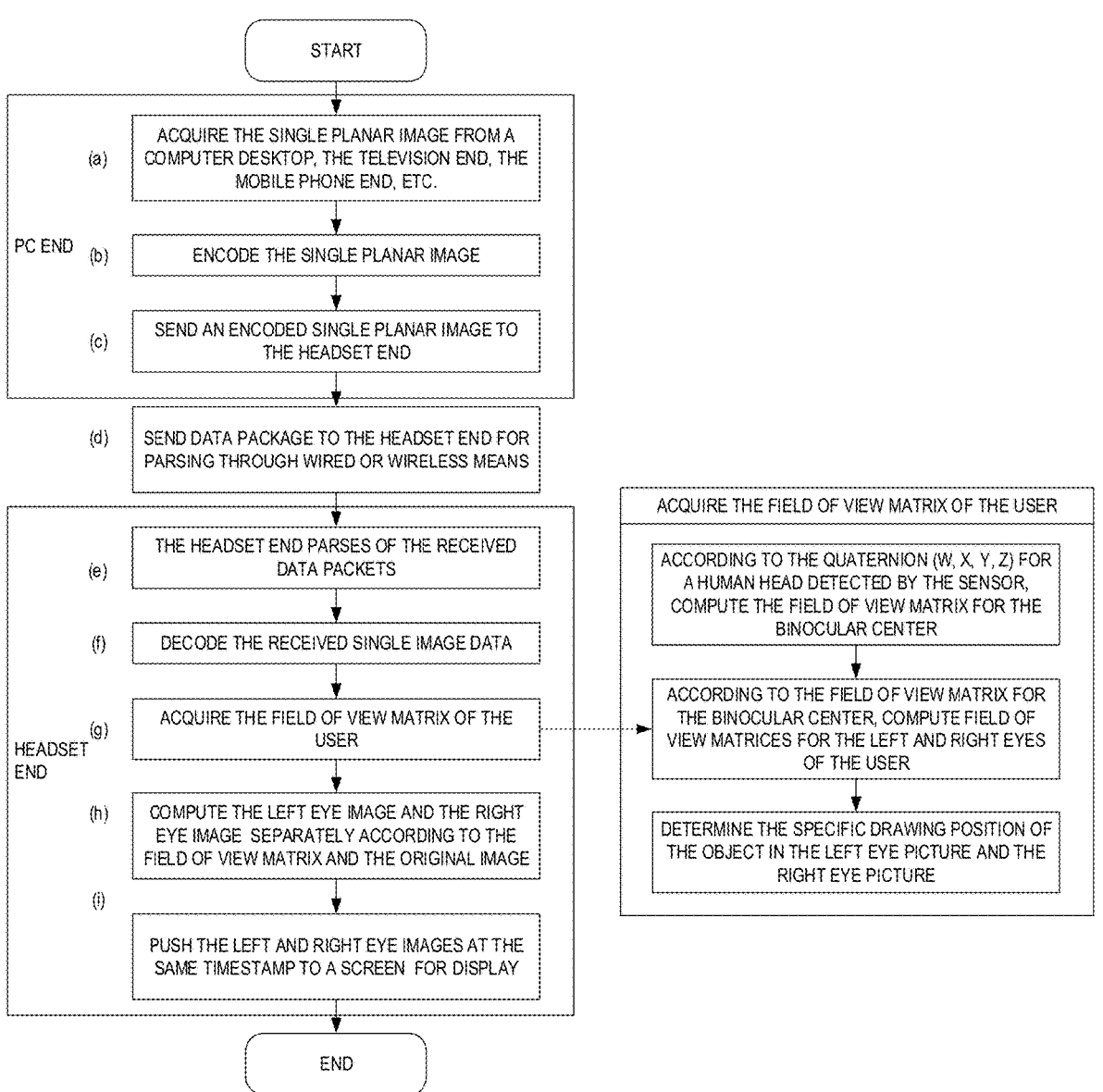
FIG. 5 shows a schematic flowchart of the overall processing procedures provided by some embodiments of the present disclosure.

FIG. 5 shows the overall processing flowchart of the present disclosure, and the following steps are specifically performed.

(a) The single planar image is acquired from a computer desktop, the television end, the mobile phone end, etc.

(b) The single planar image is encoded.

(c) An encoded single planar image is sent to the headset end.

(d) Packaged data is sent to the headset end for parsing through wired or wireless means, not limited to specific transmission methods (WIFI, DP, USB, etc.).

(e) The headset end parses the received data package.

(f) The received single image data is decoded.

(g) The field of view matrix of the user is acquired.

Specifically, according to the quaternion for the head of a human detected by the sensor, the field of view matrix for the binocular center is computed first. Then, according to the field of view matrix of the binocular center, the field of view matrices for the left and right eyes are computed, and thereby the specific drawing position of the object in the left eye picture and the right eye picture are determined.

(h) After the field of view matrices for the left and right eyes are computed, the left eye image and the right eye image are computed separately according to the field of view matrix and the original image. The specific drawing positions of the object in the left eye picture and the right eye picture are determined by the field of view matrix.

(i) At this point, the left and right eye images correspond one-to-one, and then the left and right eye images corresponding to the same timestamp are pushed to a screen for display.

Figure 6:
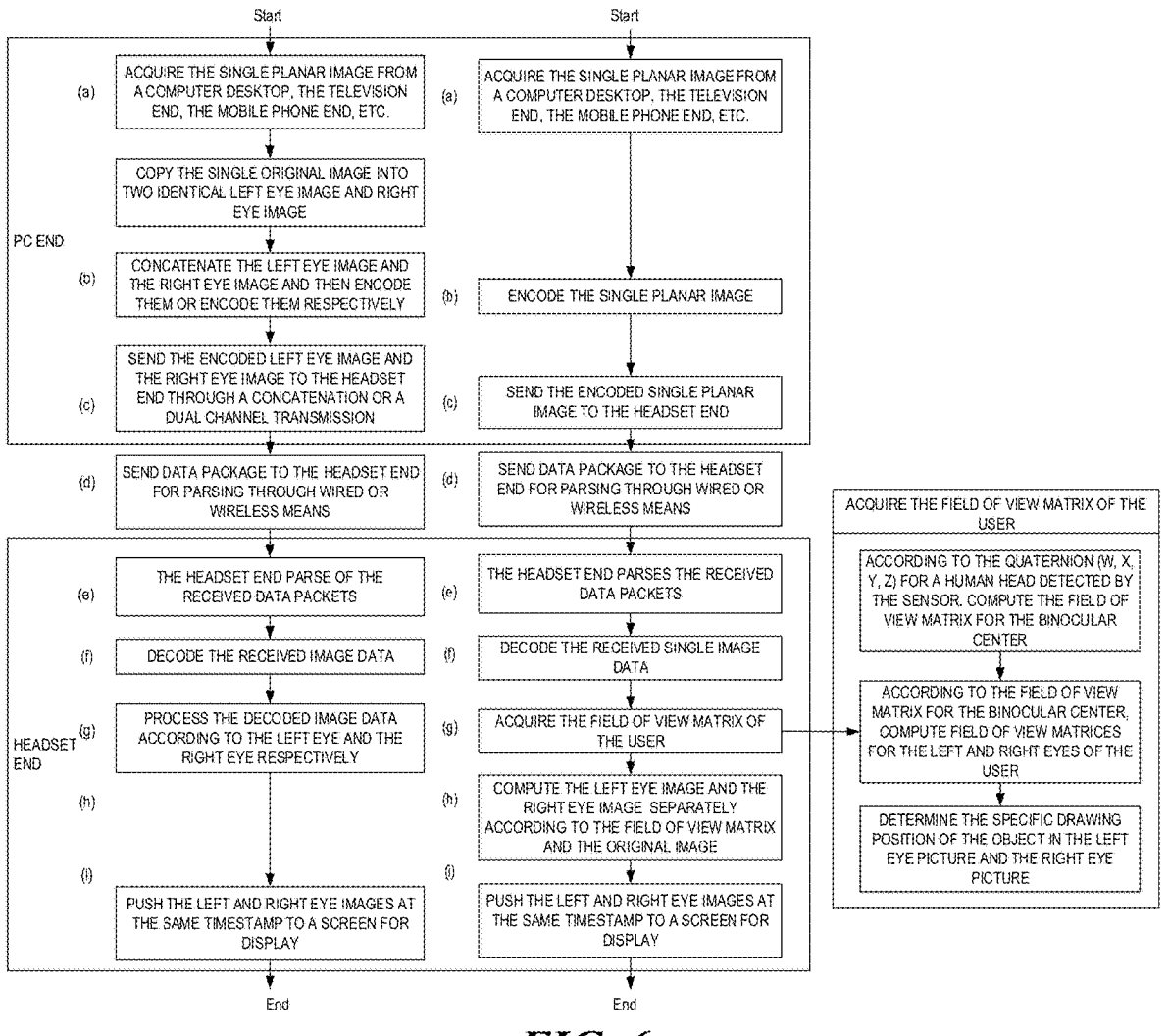
FIG. 6 shows a schematic flowchart of a comparison before and after an improvement provided by some embodiments of the present disclosure.

FIG. 6 shows a comparison of the processing procedures before and after implementing an improvement of the present disclosure compared to the prior art. Before the improvement, the single original image is copied into two identical left eye image and right eye image at the computer end, the television end, or the mobile phone end, etc., and then the left eye data and the right eye data are encoded and transmitted to the headset end, while the left eye data and the right eye data are decoded at the VR headset end and pushed to the screen for display.

After the improvement, the single original image data is encoded at the computer end, the television end, or the mobile phone end and transmitted to the VR headset end. The received single image data is parsed and decoded at the VR headset end. The field of view matrix of the user is acquired. Different left eye image data and right eye image data are acquired according to the computation for the field of view matrix and the single image. The left eye image and the righteye image at the same timestamp are pushed to the screen for display.

By comparison, it can be determined that applying the present disclosure has the following characteristics:

1. Data volume is small which is only half of the data volume of traditional solutions.

2. Synchronization of the left eye and the right eye is enhanced. The left eye data and the right eye data are strongly bound. As compared to the dual channel transmission, synchronized processing of the left eye and the right eye is not necessary.

3. Bandwidth requirement is low. Based on the above feature '1', the amount of the transmitted data is reduced, therefore the pressure on the network bandwidth is effectively reduced, frequency of network congestion is reduced, and thereby user experience is effectively improved.

4. At the PC sending end, only the single original image is needed to be encoded and transmitted, and the processing process is simple, concise, and fast.

5. The field of view matrix is applied—the interpupillary distance of the user, user-defined focal distance, and other parameter information may be acquired at the headset end, thereby the field of view matrix of the user is acquired. A linear operation of the field of view matrix is highly efficient, with low time delay, and the problem of the left eye and the right eye asynchronism caused by network transmission delay, packet loss, etc. can be minimized.

Compared with the traditional solution where the left eye image and the right eye image are needed to be copied for transmission, after the optimization of the present disclosure, the user experience effect is more stereoscopic, and the effect of virtual reality is more intense.

Figure 7:
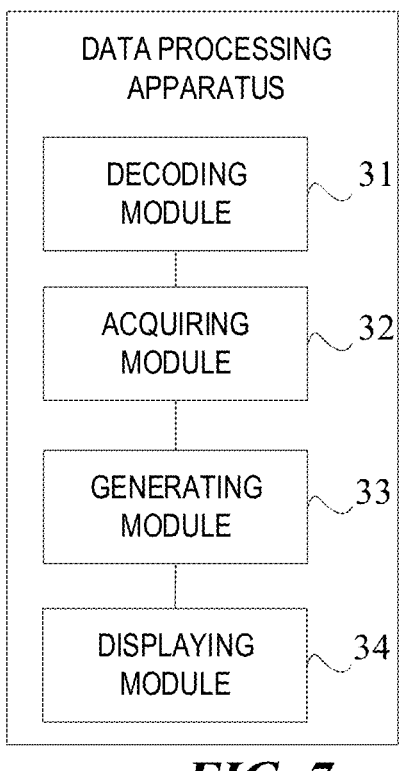
FIG. 7 shows a schematic structural diagram of a data processing apparatus provided by some embodiments of the present disclosure.

Furthermore, as a specific implementation of the methods shown in FIG. 1 and FIG. 2, this embodiment provides a data processing apparatus, as shown in FIG. 7. The apparatus includes a decoding module 31, an acquiring module 32, a generating module 33, and a displaying module 34.

The decoding module 31 is configured to decode the received image data to obtain the planar image to be processed.

The acquiring module 32 is configured to acquire the field of view information of the user.

The generating module 33 is configured to generate the left eye image and the right eye image at the same timestamp according to the field of view information and the planar image.

The displaying module 34 is configured to display the virtual reality image according to the left eye image and the right eye image at the same timestamp.

In a specific application scenario, the acquiring module 32 is specifically configured to acquire posture information for a head of the user and determine the field of view information of the user according to the posture information for the head of the user.

In a specific application scenario, optionally, the field of view information comprises the field of view matrix information of the user. The acquiring module 32 may be specifically configured to acquire the quaternion for the head of the user detected by the sensor from the posture information for the head of the user; determine the field of view matrix for the binocular center of the user according to the quaternion for the head of the use; determine field of view matrices for left and right eyes of the user according to the field of view matrix for the binocular center; determine drawing positions of the element in the left eye picture and the right eye picture using the field of view matrices for the left and right eyes.

In a specific application scenario, the acquiring module 32 is specifically further configured to convert the quaternion for the head of the user into a matrix form, to obtain the rotation matrix for the binocular center of the user and determine the offset matrix for the binocular center of the user according to the position of the binocular center in the world coordinate system; determine the field of view matrix for the binocular center according to the rotation matrix for the binocular center and the offset matrix for the binocular center.

In a specific application scenario, the acquiring module 32 is specifically further configured to multiply the rotation matrix for the binocular center and the offset matrix for the binocular center to obtain the conversion matrix for the binocular center of the user and compute the inverse matrix of the conversion matrix for the binocular center to obtain the field of view matrix for the binocular center.

In a specific application scenario, the acquiring module 32 is specifically further configured to determine displacements required to be offset for the left and right eyes based on the interpupillary distance of the user; create the homogeneous offset matrix using the displacements required to be offset for the left and right eyes.

In a specific application scenario, the acquiring module 32 is specifically further configured to determine displacements required to be offset for the left and right eyes based on an interpupillary distance of the user and create the homogeneous offset matrix using the displacements required to be offset for the left and right eyes.

In a specific application scenario, the acquiring module 32 is specifically further configured to multiply the field of view matrix for the binocular center and the homogeneous offset matrix, to obtain the field of view matrices for the left and right eyes.

In a specific application scenario, the generating module 33 is specifically configured to adjust the planar image according to the drawing position of the element in the left eye picture to obtain the left eye image and adjust the planar image according to the drawing position of the element in the right eye picture to obtain the right eye image.

In a specific application scenario, the displaying module 34 is specifically configured to display the left eye image in the left eye displaying area, while displaying the right eye image in the right eye displaying area.

It should be noted that the other corresponding descriptions of each functional unit involved in the data processing apparatus provided in this embodiment may refer to the corresponding descriptions in FIG. 1 and FIG. 2, and will not be repeated here.

Based on the methods shown in FIG. 1 and FIG. 2, this embodiment also provides a computer-readable storage medium on which a computer program is stored. When the computer program is executed by a processor, the data processing method shown in FIG. 1 and FIG. 2 is implemented.

Based on this understanding, the technical solutions disclosed in the present disclosure may be embodied in the form of a software product, which can be stored on a non-volatile storage medium (such as a CD-ROM, a USB drive, a mobile hard drive, etc.), including several instructions to enable a computer device (such as a personal computer, a server, or a network device, etc.) to execute the methods of various implementation scenarios disclosed in the present disclosure.

Based on the methods shown in FIG. 1 and FIG. 2 as well as the embodiment of the virtual apparatus shown in FIG. 7, in order to achieve the above purpose, the disclosed embodiment also provides an electronic device, such as a VR device, which includes a storage medium and a processor. The storage medium may be used to store computer programs. The processor may be used to execute computer programs to implement the data processing method shown in FIG. 1 and FIG. 2.

Optionally, the aforementioned physical device may also include a user interface, a network interface, a camera, a radio frequency (RF) circuit, a sensor, an audio circuit, a WI-FI module, etc. The user interface may include a display screen, an input unit such as a keyboard, etc. An optional user interface may also include a USB interface, a card reader interface, etc. The network interface may optionally include a standard wired interface, a wireless interface (such as a WI-FI interface), etc.

Those skilled in the art may understand that the structure of the aforementioned physical device provided in the present embodiment does not constitute a limitation on the physical device, and may include more or fewer components, combinations of certain components, or different component arrangements.

The storage medium may also include an operating system and a network communication module. The operating system is a program that manages the hardware and software resources of the aforementioned physical device, supporting the operation of information processing programs and other software and/or programs. The network communication module may be used to implement communication between various components within the storage medium, as well as communication between other hardware and software in the information processing physical device.

Through the description of the above implementation methods, the skilled in the art can clearly understand that the present disclosure may be implemented through software and a necessary universal hardware platform, or through hardware. By applying the technical solutions of the embodiments of the present disclosure, it is not necessary to first copy a planar image into two identical left and right eye image data for transmission, instead the single original planar image data is transmitted. After the single planar image is received by the VR device end, operations are performed according to the field of view matrix of the current user to obtain images suitable for the field of view of the left eye and the right eye respectively, which are finally displayed at the VR device end. The actual effect experienced by the user is the processed stereoscopic visual effect. Compared with the prior art, on the premise of ensuring the display effect, the present disclosure can reduce the amount of transmitted data by half, reduce the pressure on network bandwidth by half, reduce the situation of network congestion, and correspondingly reduce the transmission delay. There will be no problem of asynchronous transmission between the left eye and the right eye, and entire processing procedures can be simplified to be more concise and reasonable.

It should be noted that in this article, relational terms such as "first" and "second" are only used to distinguish one entity or operation from another entity or operation, and do not necessarily require or imply any actual relationship or order between these entities or operations. Moreover, the terms "comprising", "including", or any other variation thereof are intended to encompass non-exclusive inclusion, such that a process, a method, an item, or a device that includes a series of elements not only includes those elements, but also other elements that are not explicitly listed, or also include elements inherent in such a process, a method, an item, or a device. Without further limitations, the element limited by the statement "including one . . . " do not exclude the existence of other identical elements in the process, the method, the item, or the device that includes the said elements.

The above is only the specific implementation method of the present disclosure, which enables those skilled in the art to understand or implement this disclosure. Various modifications to these embodiments will be apparent to those skilled in the art, and the general principles defined in this article may be implemented in other embodiments without departing from the spirit or scope of the present disclosure. Therefore, this disclosure will not be limited to the embodiments described herein, but rather to the widest scope consistent with the principles and novel features disclosed herein.

We claim:

1. A data processing method, comprising:

decoding received image data to obtain a planar image to be processed;

acquiring field of view information of a user;

generating, according to the field of view information and the planar image, a left eye image and a right eye image at a same timestamp;

displaying a virtual reality image according to the left eye image and the right eye image at the same timestamp, wherein the acquiring field of view information of a user comprises:

acquiring posture information for a head of the user;

determining, according to the posture information for the head of the user, the field of view information of the user, wherein the field of view information comprises field of view matrix information of the user;

the determining, according to the posture information for the head of the user, the field of view information of the user comprises:

acquiring, from the posture information for the head of the user, a quaternion for the head of the user detected by a sensor;

determining, according to the quaternion for the head of the user, a field of view matrix for a binocular center of the user;

determining, according to the field of view matrix for the binocular center, field of view matrices for left and right eyes of the user;

determining, using the field of view matrices for the left and right eyes, drawing positions of an element in a left eye picture and a right eye picture.

2. The method according to claim 1, wherein the determining, according to the quaternion for the head of the user, a field of view matrix for a binocular center of the user comprises:

converting the quaternion for the head of the user into a matrix form, to obtain a rotation matrix for the binocular center of the user, and determining, according to a position of the binocular center in a world coordinate system, an offset matrix for the binocular center of the user;

determining the field of view matrix for the binocular center according to the rotation matrix for the binocular center and the offset matrix for the binocular center.

3. The method according to claim 2, wherein the determining the field of view matrix for the binocular center according to the rotation matrix for the binocular center and the offset matrix for the binocular center comprises:

multiplying the rotation matrix for the binocular center and the offset matrix for the binocular center to obtain a conversion matrix for the binocular center of the user;

computing an inverse matrix of the conversion matrix for the binocular center to obtain the field of view matrix for the binocular center.

4. The method according to claim 1, wherein the determining, according to the field of view matrix for the binocular center, field of view matrices for left and right eyes of the user comprises:

creating a homogeneous offset matrix based on an interpupillary distance of the user;

determining, according to the homogeneous offset matrix and the field of view matrix for the binocular center, the field of view matrices for the left and right eyes.

5. The method according to claim 4, wherein the creating a homogeneous offset matrix based on an interpupillary distance of the user comprises:

determining, based on an interpupillary distance of the user, displacements required to be offset for the left and right eyes;

creating, using the displacements required to be offset for the left and right eyes, the homogeneous offset matrix.

6. The method according to claim 4, wherein the determining, according to the homogeneous offset matrix and the field of view matrix for the binocular center, the field of view matrices for the left and right eyes comprises:

multiplying the field of view matrix for the binocular center and the homogeneous offset matrix, to obtain the field of view matrices for the left and right eyes.

7. The method according to claim 1, wherein the generating, according to the field of view information and the planar image, a left eye image and a right eye image at a same timestamp comprises:

adjusting, according to a drawing position of an element in a left eye picture, the planar image to obtain the left eye image, and adjusting, according to a drawing position of an element in a right eye picture, the planar image to obtain the right eye image.

8. The method according to claim 1, wherein the displaying a virtual reality image according to the left eye image and the right eye image at the same timestamp comprises:

displaying the left eye image in a left eye displaying area, while displaying the right eye image in a right eye displaying area.

9. A non-transitory computer-readable storage medium, storing a computer program thereon that, when executed by a processor to implement a data processing method, the method comprising:

decoding received image data to obtain a planar image to be processed;

acquiring field of view information of a user;

generating, according to the field of view information and the planar image, a left eye image and a right eye image at a same timestamp;

displaying a virtual reality image according to the left eye image and the right eye image at the same timestamp, wherein the acquiring field of view information of a user comprises:

acquiring posture information for a head of the user;

determining, according to the posture information for the head of the user, the field of view information of the user, wherein the field of view information comprises field of view matrix information of the user;

the determining, according to the posture information for the head of the user, the field of view information of the user comprises:

acquiring, from the posture information for the head of the user, a quaternion for the head of the user detected by a sensor;

determining, according to the quaternion for the head of the user, a field of view matrix for a binocular center of the user;

determining, according to the field of view matrix for the binocular center, field of view matrices for left and right eyes of the user;

determining, using the field of view matrices for the left and right eyes, drawing positions of an element in a left eye picture and a right eye picture.

10. The non-transitory computer-readable storage medium according to claim 9, wherein the determining, according to the quaternion for the head of the user, a field of view matrix for a binocular center of the user comprises:

converting the quaternion for the head of the user into a matrix form, to obtain a rotation matrix for the binocular center of the user, and determining, according to a position of the binocular center in a world coordinate system, an offset matrix for the binocular center of the user;

determining the field of view matrix for the binocular center according to the rotation matrix for the binocular center and the offset matrix for the binocular center.

11. The non-transitory computer-readable storage medium according to claim 10, wherein the determining the field of view matrix for the binocular center according to the rotation matrix for the binocular center and the offset matrix for the binocular center comprises:

multiplying the rotation matrix for the binocular center and the offset matrix for the binocular center to obtain a conversion matrix for the binocular center of the user;

computing an inverse matrix of the conversion matrix for the binocular center to obtain the field of view matrix for the binocular center.

12. The non-transitory computer-readable storage medium according to claim 9, wherein the determining, according to the field of view matrix for the binocular center, field of view matrices for left and right eyes of the user comprises:

creating a homogeneous offset matrix based on an interpupillary distance of the user;

determining, according to the homogeneous offset matrix and the field of view matrix for the binocular center, the field of view matrices for the left and right eyes.

13. The non-transitory computer-readable storage medium according to claim 12, wherein the creating a homogeneous offset matrix based on an interpupillary distance of the user comprises:

determining, based on an interpupillary distance of the user, displacements required to be offset for the left and right eyes;

creating, using the displacements required to be offset for the left and right eyes, the homogeneous offset matrix.

14. An electronic device, comprising a storage medium, a processor, and a computer program stored in the storage medium and executable on the processor, wherein the processor implements a data processing method, the method comprising:

decoding received image data to obtain a planar image to be processed;

acquiring field of view information of a user;

generating, according to the field of view information and the planar image, a left eye image and a right eye image at a same timestamp;

displaying a virtual reality image according to the left eye image and the right eye image at the same timestamp, wherein the acquiring field of view information of a user comprises:

acquiring posture information for a head of the user;

determining, according to the posture information for the head of the user, the field of view information of the user, wherein the field of view information comprises field of view matrix information of the user;

the determining, according to the posture information for the head of the user, the field of view information of the user comprises:

acquiring, from the posture information for the head of the user, a quaternion for the head of the user detected by a sensor;

determining, according to the quaternion for the head of the user, a field of view matrix for a binocular center of the user;

determining, according to the field of view matrix for the binocular center, field of view matrices for left and right eyes of the user;

determining, using the field of view matrices for the left and right eyes, drawing positions of an element in a left eye picture and a right eye picture.

15. The electronic device according to claim 14, wherein the determining, according to the quaternion for the head of the user, a field of view matrix for a binocular center of the user comprises:

converting the quaternion for the head of the user into a matrix form, to obtain a rotation matrix for the binocular center of the user, and determining, according to a position of the binocular center in a world coordinate system, an offset matrix for the binocular center of the user;

determining the field of view matrix for the binocular center according to the rotation matrix for the binocular center and the offset matrix for the binocular center.

16. The electronic device according to claim 15, wherein the determining the field of view matrix for the binocular center according to the rotation matrix for the binocular center and the offset matrix for the binocular center comprises:

multiplying the rotation matrix for the binocular center and the offset matrix for the binocular center to obtain a conversion matrix for the binocular center of the user;

computing an inverse matrix of the conversion matrix for the binocular center to obtain the field of view matrix for the binocular center.

17. The electronic device according to claim 9, wherein the determining, according to the field of view matrix for the binocular center, field of view matrices for left and right eyes of the user comprises:

creating a homogeneous offset matrix based on an interpupillary distance of the user;

determining, according to the homogeneous offset matrix and the field of view matrix for the binocular center, the field of view matrices for the left and right eyes.

18. The electronic device according to claim 17, wherein the creating a homogeneous offset matrix based on an interpupillary distance of the user comprises:

determining, based on an interpupillary distance of the user, displacements required to be offset for the left and right eyes;

creating, using the displacements required to be offset for the left and right eyes, the homogeneous offset matrix.

19. The electronic device according to claim 17, wherein the determining, according to the homogeneous offset matrix and the field of view matrix for the binocular center, the field of view matrices for the left and right eyes comprises:

multiplying the field of view matrix for the binocular center and the homogeneous offset matrix, to obtain the field of view matrices for the left and right eyes.

20. The electronic device according to claim 9, wherein the generating, according to the field of view information and the planar image, a left eye image and a right eye image at a same timestamp comprises:

adjusting, according to a drawing position of an element in a left eye picture, the planar image to obtain the left eye image, and adjusting, according to a drawing position of an element in a right eye picture, the planar image to obtain the right eye image.

* * * * *